United States Patent
Guo et al.

(10) Patent No.: US 10,173,520 B1
(45) Date of Patent: Jan. 8, 2019

(54) FUEL CAP DETECTION SYSTEM

(71) Applicant: Nissan North America, Inc., Franklin, TN (US)

(72) Inventors: Yichao Guo, Rochester Hills, MI (US); Janean Kowalkowski, Northville, MI (US)

(73) Assignee: Nissan North America, Inc., Franklin, TN (US)

( * ) Notice: Subject to any disclaimer, the term of this patent is extended or adjusted under 35 U.S.C. 154(b) by 0 days.

(21) Appl. No.: 15/720,748

(22) Filed: Sep. 29, 2017

(51) Int. Cl.
 *B60K 15/04* (2006.01)
 *F02M 25/08* (2006.01)
 *B60K 15/035* (2006.01)

(52) U.S. Cl.
 CPC .... *B60K 15/03504* (2013.01); *B60K 15/0406* (2013.01); *F02M 25/0809* (2013.01); *F02M 25/0836* (2013.01); *B60K 2015/0493* (2013.01)

(58) Field of Classification Search
 CPC .......... B60K 15/03504; B60K 15/0406; B60K 2015/0493; F02M 25/0809; F02M 25/0836
 See application file for complete search history.

(56) References Cited

U.S. PATENT DOCUMENTS

| | | | |
|---|---|---|---|
| 5,637,788 A * | 6/1997 | Remboski | F02M 25/0809 73/40.5 R |
| 6,202,478 B1 * | 3/2001 | Blomquist | F02M 25/0818 701/32.8 |
| 6,931,926 B1 * | 8/2005 | Van Ee | F02D 33/003 73/291 |
| 7,005,975 B2 | 2/2006 | Lehner | |
| 2005/0057349 A1 * | 3/2005 | Lehner | B60K 15/03504 340/451 |
| 2006/0011164 A1 * | 1/2006 | Kropinski | F02D 41/042 123/198 D |
| 2006/0032547 A1 * | 2/2006 | Rossi | G01F 23/0069 141/94 |
| 2006/0229796 A1 * | 10/2006 | Booms | F02M 25/0809 701/114 |
| 2008/0105329 A1 * | 5/2008 | Benjey | B67D 7/0476 141/59 |
| 2008/0278300 A1 * | 11/2008 | Deleon | B60K 15/0406 340/438 |
| 2009/0091438 A1 * | 4/2009 | Rovik | B60K 15/05 340/457 |
| 2009/0099795 A1 * | 4/2009 | Behar | F02M 25/0818 702/51 |
| 2009/0314072 A1 | 12/2009 | Slusser et al. | |

(Continued)

*Primary Examiner* — Joseph H Feild
*Assistant Examiner* — Rufus C Point
(74) *Attorney, Agent, or Firm* — Global IP Counselors, LLP

(57) ABSTRACT

A fuel cap detection system includes a charcoal canister, a notification system, and an electronic controller. The charcoal canister is connected to a fuel tank of a vehicle, the charcoal canister includes a vent valve. The notification system is configured to notify a user when a fuel cap is incorrectly positioned. The electronic controller is configured to perform a leak detection test on the fuel tank by activating the vent valve in the charcoal canister to determine whether the fuel cap is positioned incorrectly, and determine an intent of the user to reposition the fuel cap while the notification system notifies the user that the fuel cap is incorrectly positioned.

17 Claims, 8 Drawing Sheets

(56) References Cited

U.S. PATENT DOCUMENTS

| | | | | |
|---|---|---|---|---|
| 2012/0079873 A1* | 4/2012 | Jackson | ........... | B60K 15/03519 73/49.3 |
| 2014/0352796 A1* | 12/2014 | Dudar | .................. | B60K 15/035 137/15.01 |
| 2015/0032307 A1* | 1/2015 | Lindlbauer | .......... | B60K 15/035 701/22 |

* cited by examiner

FUEL CAP DETECTION SYSTEM

BACKGROUND

Field of the Invention

The present invention generally relates to a fuel cap detection system. More specifically, the present invention relates to a fuel cap detection system that accurately determines when a fuel cap is improperly positioned.

Background Information

Modern automotive vehicles typically include a fuel tank and an evaporative emission control system that collects volatile fuel vapors generated in the fuel tank. The evaporative emission control system includes a vapor collection canister, usually containing an activated charcoal mixture, to collect and store volatile fuel vapors. Normally, the canister collects volatile fuel vapors which accumulate during refueling of the automotive vehicle or from increases in fuel temperature. The evaporative emission control system also includes a purge valve placed between an intake manifold of an engine of the automotive vehicle and the canister. The purge valve is opened by an engine control unit an amount determined by the engine control unit to purge the canister, i.e., the collected volatile fuel vapors are drawn into the intake manifold from the canister for ultimate combustion within a combustion chamber of the engine.

Governmental regulations require that certain automotive vehicles powered by volatile fuels such as gasoline have their evaporative emission control systems checked to determine if a leak exists in the system. As a result, on board vehicle diagnostic systems have been developed to determine if a leak is present in a portion of the evaporative emission control system. One such diagnostic system utilizes a vacuum regulator/sensor unit to draw a vacuum on the evaporative emission control system and sense whether a loss of vacuum occurs within a specified period of time.

Diagnostic systems also exist for determining the presence of a leak in an evaporative emission control system which utilizes positive pressurization rather than negative pressurization, i.e., vacuum. In positive pressurization systems, the evaporative emission control system is pressurized to a set pressure, typically through the use of an electric air pump. A sensor determines whether the pressure remains constant over a certain amount of time.

At times, a leak will exist in the system due to a fuel cap sealing problem. That is, the fuel cap is either missing, loose, or is not properly sized to the fuel tank fill tube. Present diagnostic systems do not specifically perform a test to identify this type of leak condition. As such, the sealing problem is not detected until operation of the standard diagnostic test. Further, conventional diagnostic systems treat such a leak condition the same as other types of leaks thereby activating the warning signals and/or setting fault codes.

SUMMARY

Conventional fuel cap off strategy can rely on an Engine Off Nature Vacuum (EONV) method, which is performed during an engine off period and is mainly designed to detect 0.02" of leakage in the fuel tank system. It combines refuel event flag with the EONV strategy. When refueling is detected, and leakage is detected by the EONV, then Fuel Cap Off warning is set. For the next key off EONV test, the warning will be turned off if EONV test passes. It has been discovered that the entry conditions of conventional fuel cap off detection has significant restrictive conditions on ambient temperature, mileage of driving, fuel temperature change, etc. Moreover, the conventional system may not provide a fuel cap off warning to the driver or user for serval key cycles, even when the user forgets to put fuel cap back after refuel. Accordingly, significant fuel vapor may enter the atmosphere before the warning is turned on. Further, conventional fuel cap off detection systems have an entry condition of 15%~90% fuel level. Such entry conditions are not reasonable, since fuel cap off generally occurs after refuel, and most drivers will fill the whole fuel tank instead of less than 90%. EONV is sensitive to ambient temperature/fuel temperature change, and is designed to detect very small leakage. False detection happens when certain thermal conditions of nearby subjects change. fuel cap off detection is equivalent to a significant (i.e., larger than 0.2") hole in the fuel tank system, and EONV method mismatches the actual needs of fuel cap off detection, even though it may be able detect it.

Accordingly, a more accurate fuel cap detection system is needed. In view of the state of the known technology, one aspect of the present disclosure is to provide a fuel cap detection system, comprising a charcoal canister, a notification system, and an electronic controller. The charcoal canister is connected to a fuel tank of a vehicle, the charcoal canister includes a vent valve. The notification system is configured to notify a user when a fuel cap is incorrectly positioned. The electronic controller is configured to perform a leak detection test on the fuel tank by activating the vent valve in the charcoal canister to determine whether the fuel cap is positioned incorrectly, and determine an intent of the user to reposition the fuel cap while the notification system notifies the user that the fuel cap is incorrectly positioned.

In view of the state of the known technology, another aspect of the present disclosure is to provide a fuel cap detection system, comprising a charcoal canister, a notification system, and an electronic controller. The charcoal canister is connected to a fuel system of a vehicle, the charcoal canister including a vent valve. The notification system is configured to notify a user when a fuel cap of the vehicle is incorrectly positioned. The electronic controller is configured to perform a leak detection test on the fuel tank by activating the vent valve in the charcoal canister to determine whether the fuel system has a leak, and when pressure in the fuel tank is less than a threshold pressure at less than a predetermined amount of time determine that the leak is caused by a first opening having a diameter no greater than a predetermined diameter, and when the pressure in the fuel tank is greater than the threshold pressure at greater than the predetermined amount of time determine the leak is caused by a second opening having a diameter greater than the predetermined diameter, and cause the notification system to notify the user that the fuel cap is incorrectly positioned when the leak is caused by the second opening.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
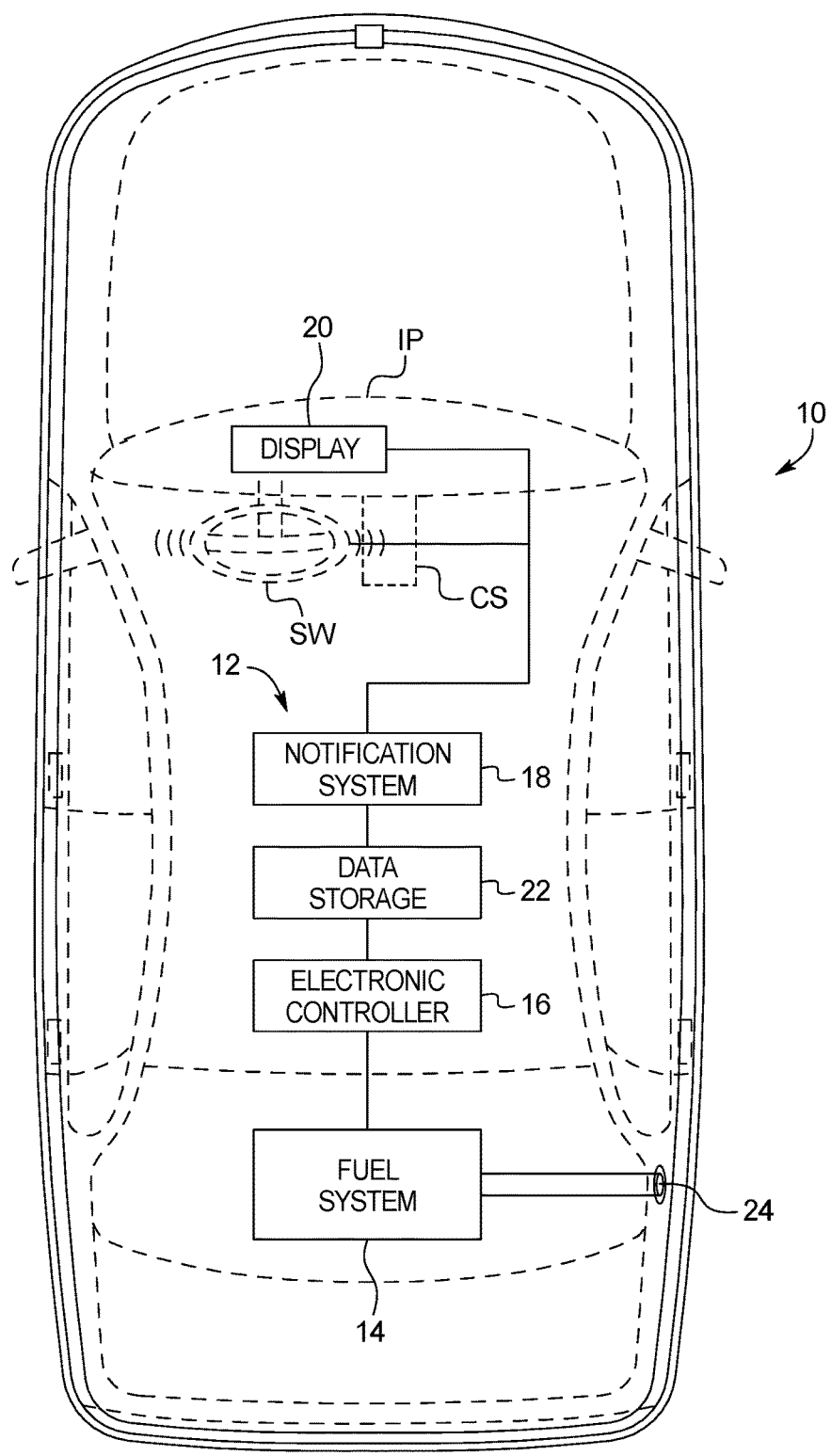
FIG. 1 is a schematic view of an example of components of a vehicle employing the fuel cap detection system according to a disclosed embodiment.
Figure 2:
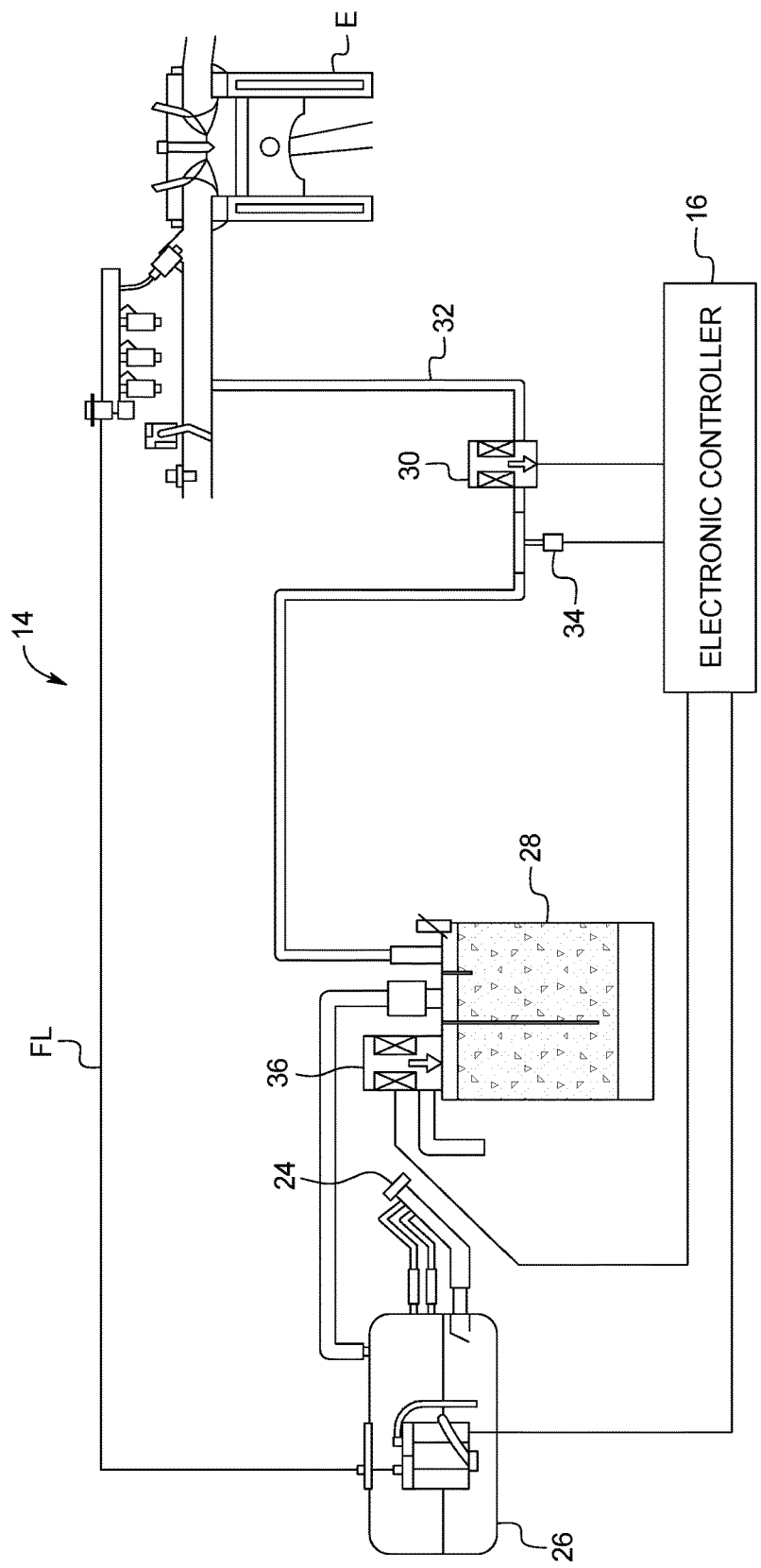
FIG. 2 is a schematic view of a fuel system employing the fuel cap detection system according to a disclosed embodiment.

FIG. 1 is a schematic view of an example of components of a vehicle 10 employing a fuel cap detection system 12 according to a disclosed embodiment, and FIG. 2 is a schematic view of an example of fuel system 14 employing the fuel cap detection system 12 of the vehicle 10 shown in FIG. 1. The vehicle 10 can be any type of vehicle, such as a conventional combustion engine vehicle, a hybrid vehicle, an autonomous vehicle and so on as understood in the art. The vehicle 10 includes an electronic controller 16, vehicle notification system 18, a display 20, and data storage 22, and any other types of equipment typically present in a vehicle 10 as understood in the art.

The electronic controller 16 will hereinafter be referred to simply as the controller 16. The controller 16 preferably includes a microcomputer having one or more processors with a vehicle monitoring control program that controls the components of the fuel cap detection system 12 as discussed below. The controller 16 includes other conventional components such as an input interface circuit, an output interface circuit, and storage devices such as a ROM (Read Only Memory) device and a RAM (Random Access Memory) device. The microcomputer of the controller 16 is at least programmed to carry fuel system monitoring in accordance with the flow charts of FIGS. 3-4B and the driver intention prediction of FIGS. 5A and 5B, as discussed below. It will be apparent to those skilled in the art from this disclosure that the precise structure and algorithms for the controller 16 can be any combination of hardware and software that will carry out the functions of the present invention. Furthermore, the controller 16 can communicate with the other components of the fuel cap detection system 12 discussed herein via, for example, a controller area network (CAN) bus or in any other suitable manner as understood in the art.

The controller 16 is operatively coupled to the notification system 18, the display 20, the data storage 22 and the other types of equipment on the vehicle 10 in any suitable manner as understood in the art, and is programmed to monitor and control these components as discussed herein. The data storage 22 can also store processing results and control programs that are run by the controller 16, such as processing results and control programs for the notification system 18, the display 20, the data storage 22 and any other suitable information.

The data storage device 22 is a computer memory device (i.e., a nonvolatile memory device) can store vehicle data and fuel system data, as well as any other suitable data. Furthermore, the data storage device 22 can store other types of data, such as data pertaining to vehicle-related parameters and vehicle conditions. For example, the vehicle-related parameters can include predetermined data indicating relationships between vehicle speed, vehicle acceleration, yaw, steering angle, etc. when a vehicle is preparing to make a turn, slow down, stop, or change transmission settings (e.g., drive, neutral, park, etc.). The data storage device 22 can include, for example, a large-capacity storage medium such as a CD-ROM (Compact Disk-Read Only Memory) or IC (Integrated Circuit) card. The data storage device 22 permits a read-out operation of reading out data held in the large-capacity storage medium in response to an instruction from the controller 16 to, for example, acquire vehicle driving status. The information in the data storage device 22 can also be updated by the controller 16 or in any suitable manner as discussed herein and as understood in the art.

The notification system 18 can be any suitable notification system that can notify a driver or a user that a fuel cap 24 is improperly positions (e.g., the cap is not positioned properly or not positioned at all or any other issue with the fuel cap 24). The notification system 18 can include a display 20 in the vehicle 10 (e.g., within the meter cluster, or on the instrument panel IP or on the center stack CS or any suitable or desired position). The display 20 can include a warning light or any other suitable display. The notification system 18 can include haptic feedback in the steering wheel SW or a seat or in any other suitable manner, and can include auditory warnings.

FIG. 2 illustrates a fuel system 14 that employs the fuel cap detection system 12 discussed herein. The fuel system 14 includes a fuel tank 26, the fuel or filler cap 24, a charcoal canister 28, a purge valve 30, and evaporator purge vapor line 32 and a service port 34. The fuel tank 26 is filled through the filler tube, which is in turn closed by the fuel cap 24. The fuel tank 26 is connected to the fuel injection system of the engine E of the vehicle 10 by a liquid fuel line FL. The charcoal canister 28 is connected to the fuel tank 26 via the evaporator purge vapor line 32 and includes a canister vent valve 36. The canister vent valve 36 can be vented to the atmosphere. The charcoal canister 28 is in turn connected to the service port 34 and the purge valve 30 via the evaporator purge vapor line 32. The evaporator purge vapor line 32 is then connected to the fuel injection system of the engine of the vehicle 10.

The charcoal canister 28 and evaporator purge vapor line 32 act an evaporative emission control system (EVAP) in the vehicle 10. The EVAP in the vehicle 10 can control the emission of evaporative vapor, and feed the evaporated fuel vapor back to engine for burning. An EVAP pressure sensor can be mounted on the charcoal canister 28 in one embodiment. Due to the direct impact on the environment, U.S. regulations are very restrictive regarding the leakage of the evaporative system, and mandate the detection of any leakage in the whole evaporative system that is equivalent to or larger than a hole with 0.02" in diameter (i.e., a first opening).

In determining whether the fuel cap 24 is off or improperly positioned, the controller 16 can operate and control the EVAP system to determine whether the fuel cap 24 has been replaced, improperly positioned or simply not replaced. As shown in FIG. 3, the controller 16 can determine whether a refueling event has occurred. Such an event can be determined in any suitable manner, such as by determining whether the fuel tank 26 has had a significant increase in fuel. If such a determination is made a refueling flag is stored in the data storage 22 (e.g. non-volatile ram). In one embodiment, the refueling flag is changed from 0 to 1 after the refuel event is detected. This flag can be reset to 0 by the controller 16 when a predetermined amount of fuel is consumed or a predetermined amount time of fueled engine running has occurred to ensure the flag is 0 for the next refuel event.

The controller 16 can then perform an intrusive fuel tank leak detection, as discussed in more detail below. The intrusive fuel tank leak detection is performed by closing the canister vent value 36 at the prescribed timing, activate the purge valve 30 to allow the EVAP pressure to drop when purging, and reset both valves when the test completes. The controller 16 then monitors whether the EVAP pressure is less than a first threshold (threshold 1) and whether the time is less than a first threshold time (threshold 2). When the EVAP pressure is less than the first threshold (threshold 1) and the time is less than the first threshold time (threshold 2) the controller 16 determines that the canister vent valve 36 is clogged.

If the controller 16 determines the EVAP pressure is not less than the first threshold (threshold 1) for the first threshold time (threshold 2), the controller 16 determines whether the EVAP pressure is less than the first threshold (threshold 1) and the time is less than a second threshold time (threshold 3). If the EVAP pressure is less than the first threshold (threshold 1) and the time is less than the second threshold time (threshold 2), the controller 16 determines that there is no gross leak and the fuel cap 24 is properly positioned and installed. In this situation, the controller can determine that there is a small leak (e.g., less than 0.2" or a predetermined diameter) which defines a first opening.

If the EVAP pressure is not less than the first threshold (threshold 1) for the second threshold time (threshold 3), the controller 16 determines whether the time is greater than or equal to the second threshold time (threshold 3) and whether a purge effort index (PEI) is greater than or equal to a PEI threshold and whether the EVAP is greater than the first threshold (threshold 1). If the time is greater than or equal to the second threshold time (threshold 3) and whether the PEI is greater than or equal to a PEI threshold and whether the EVAP is greater than the first threshold (threshold 1), the controller 16 determines that a gross leak (a second opening) is present and that the fuel cap 24 is improperly positioned (e.g., not positioned or not secure).

In other words, the an controller 16 is configured to perform a leak detection test on the fuel tank 26 by activating the vent valve 36 in the charcoal canister 28 to determine whether the fuel system has a leak, and when pressure in the fuel tank 26 is less than a threshold pressure at less than a predetermined amount of time determine, the controller determines that the leak is caused by a first opening having a diameter no greater than a predetermined diameter, and when the pressure in the fuel tank 26 is greater than the threshold pressure at greater than the predetermined amount of time determine the leak is caused by a second opening (i.e., the fuel cap 24 being improperly positioned) having a diameter greater than the predetermined diameter. As will be understood, the controller then can cause the notification system 18 to notify the user that the fuel cap 24 is incorrectly positioned when the leak is caused by the second opening.

As discussed herein, the driver can be notified by visual notification via the display 20, auditory notification, or haptic feedback, or any other suitable warning or notification that a gross leak is present and that the fuel cap 24 is improperly positioned. Once the driver is notified, the controller 16 is configured to determine the intent of the driver or user. As described herein, the driver can slow or stop the vehicle 10, place the vehicle in park and/or open a door. Once the driver performs at least one of these or other actions discussed herein, the controller 16 can deactivate or stop the notification.

Figure 3A:
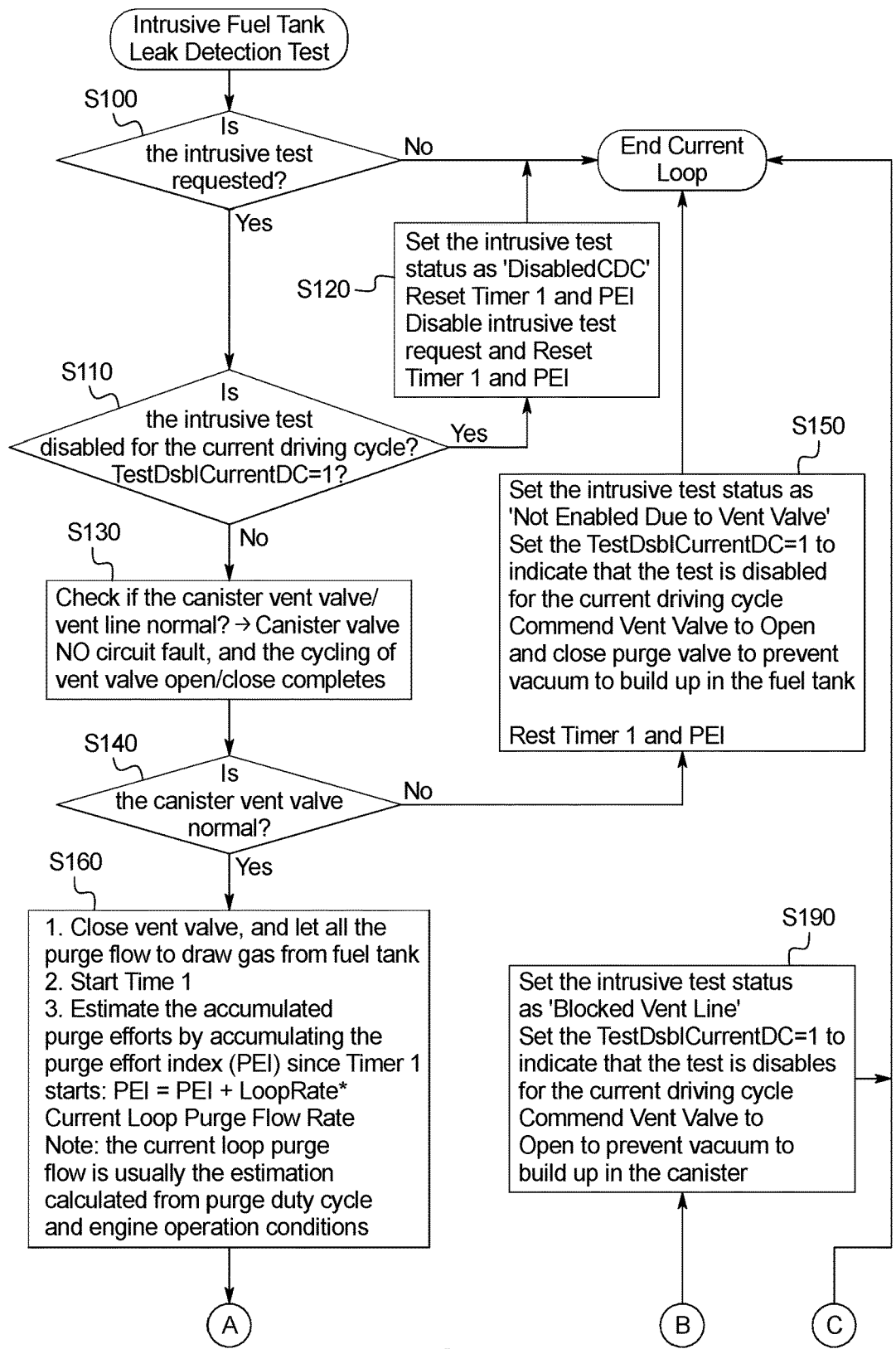
FIGS. 3A and 3B are a flow chart illustrating an intrusive fuel tank leak detection test according to an embodiment of the present invention.
Figure 3B:
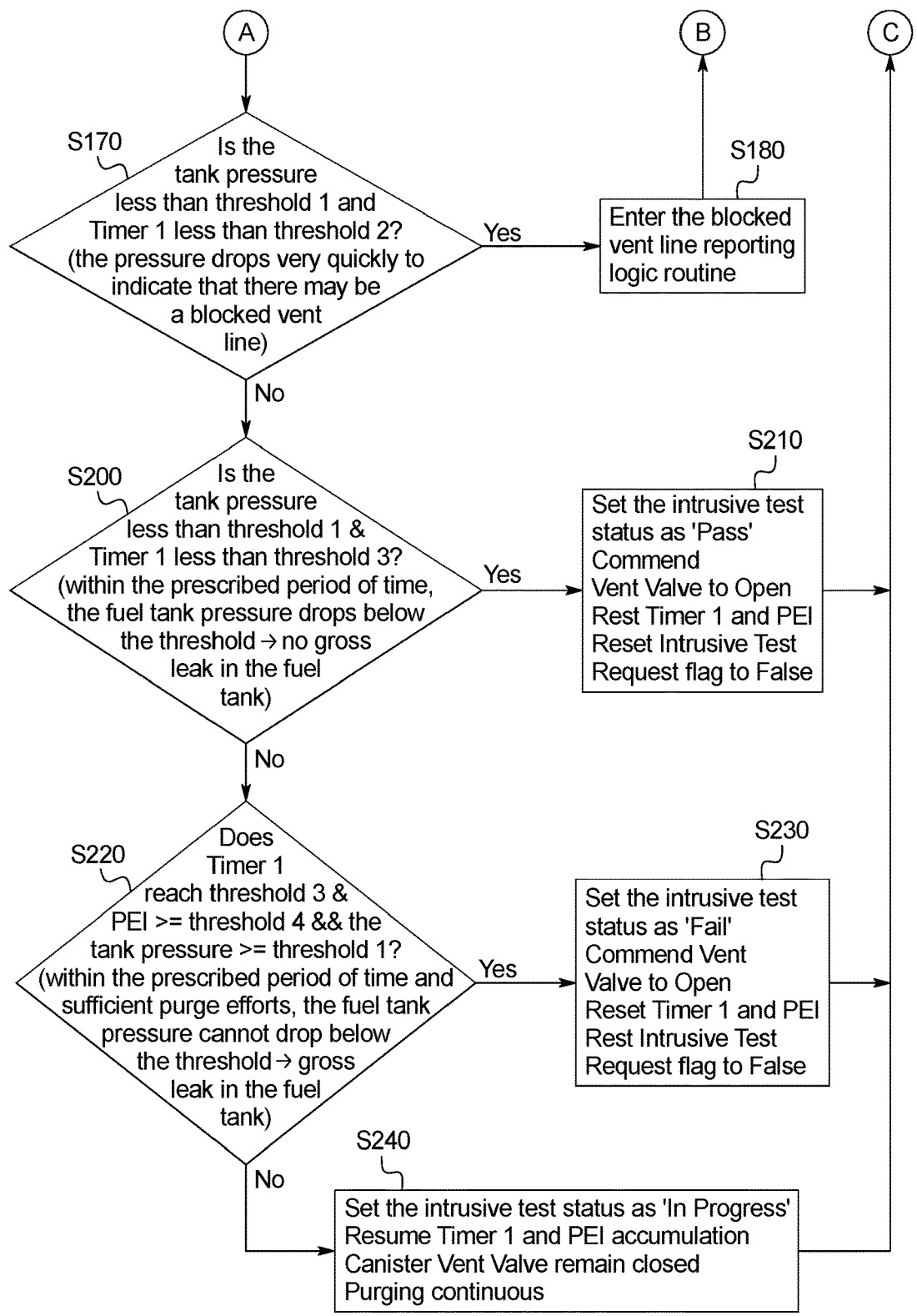

Turning now to FIGS. 3A and 3B, the flow chart illustrating the intrusive fuel tank leak detection test will be discussed. First, in step S100, the controller 16 determines whether the intrusive fuel tank leak detection test is requested or required. If the intrusive fuel tank leak detection test is not requested or required, the controller 16 ends the current loop. If the intrusive fuel tank leak detection test is requested or required, the controller 16 determines whether the intrusive fuel tank leak detection test is disabled for the current driving cycle (TestDSBLCurrentDC=1) in step S110. If the intrusive fuel tank leak detection test is disabled for the current driving cycle, the controller 16 sets the intrusive fuel tank leak detection test status as Disabled CDC in the data storage 22 in step S120 and ends the current loop.

If the intrusive fuel tank leak detection test is not disabled for the current driving cycle, the controller 16 checks whether the canister vent valve 36 (or the vent line 32) is normal in step S130. That is, the controller 16 determines whether there is a circuit fault and the cycling of the canister vent valve 36 from open to close is completed. In step 140, if the controller 16 determines that the canister vent valve 36 is not normal, the controller 16 sets the intrusive fuel tank leak detection test status as "not enabled due to vent valve" and sets the TestDSBLCurrentDC=1 the data storage 22 to indicate that the intrusive fuel tank leak detection test is disabled for the current drive cycle in step S150. The controller 16 also causes the vent valve 36 to open and closes the purge valve 30 to prevent a vacuum from building in the fuel tank 26, and resets the time and PEI. The controller 16 then ends the current loop. If the controller 16 determines that the canister vent valve 36 is normal, the controller 16 closes the vent valve 36, and enables the purge flow to draw gas from the gas tank in step S160. The controller 16 also starts timing and estimates the accumulated purge effort by the accumulating the PEI. The estimated accumulated purge effort can be calculated based on the time PEI=PEI+Looprate*Current Loop Purge Flow Rate. The Current Loop Purge Flow Rate can be the estimated calculation from the purge duty cycle and engine operating conditions. The controller 16, in step S170 then determines whether the tank pressure is less than the threshold 1 and whether the time is less than a threshold time (threshold 2). As can be appreciated, the pressure can drop very quickly, which indicates a block vent line 32. When the gas tank pressure is less than the threshold 1 and the time is less than threshold 2, the controller 16 enters a blocked vent line reporting logic routine in step S180. The controller 16 then sets the intrusive fuel tank leak detection test status as "Blocked Vent Line', and sets the TestDsblCurrentDC=1 in the data storage 22 to indicate that the intrusive fuel tank leak detection test is disabled for the current driving cycle, and causes the vent valve 36 to open to prevent a vacuum build up in the cannister in step 190. The controller 16 then ends the current loop.

When the gas tank pressure is not less than the threshold 1 for the time less than threshold 2, the controller 16 determines whether the gas tank pressure is less than the threshold 1 and the time is less than a second threshold time (threshold 3) in step S200. When the controller 16 determines that the tank pressure is less than the threshold 1 for a time less than threshold 3 (i.e., within a prescribed period of time, the fuel tank pressure drops below the threshold, the controller 16 determines that no gross leak is present in the fuel tank 26), and sets the intrusive fuel tank leak detection test status to "Pass" in the data storage 22 and causes the vent valve 36 to open and reset the timer and PEI, and resets the intrusive fuel tank leak detection test request flag to false in step S210. The controller 16 then ends the current loop.

When the controller 16 determines that the gas tank pressure is not less than the threshold 1 for a time less than threshold 3, the controller 16 determines whether the time is greater than or equal to threshold 3 and whether the PEI is greater than or equal to a threshold (threshold 4) and whether the tank pressure is greater than threshold 1 in step S220. When the controller 16 determines that the time is greater than or equal to threshold 3 and whether the PEI is greater than or equal to a threshold (threshold 4) and whether the gas tank pressure is greater than threshold 1 (i.e., within a prescribed period of time and with sufficient purge efforts, the fuel tank pressure does not drop below the threshold 1), the controller 16 determines that there is a gross leak in the fuel tank 26, and sets the intrusive fuel tank leak detection test status to "Fail", and causes the vent valve 36 to open, resets the time and PEI, and resets the intrusive fuel tank leak detection test request flag to false in step S230. The controller 16 then ends the current loop.

When the controller 16 determines that the time is greater than or equal to threshold 3 and whether the PEI is not greater than or equal to the threshold 4 with the threshold 3 time and that the tank pressure is not greater than threshold 1, the controller 16 sets the intrusive fuel tank leak detection test status as "In Progress", resumes the time and PEI accumulation in step S240, the canister 28 remains closed, and purging in continued. The current loop is then ended.

Figure 4A:
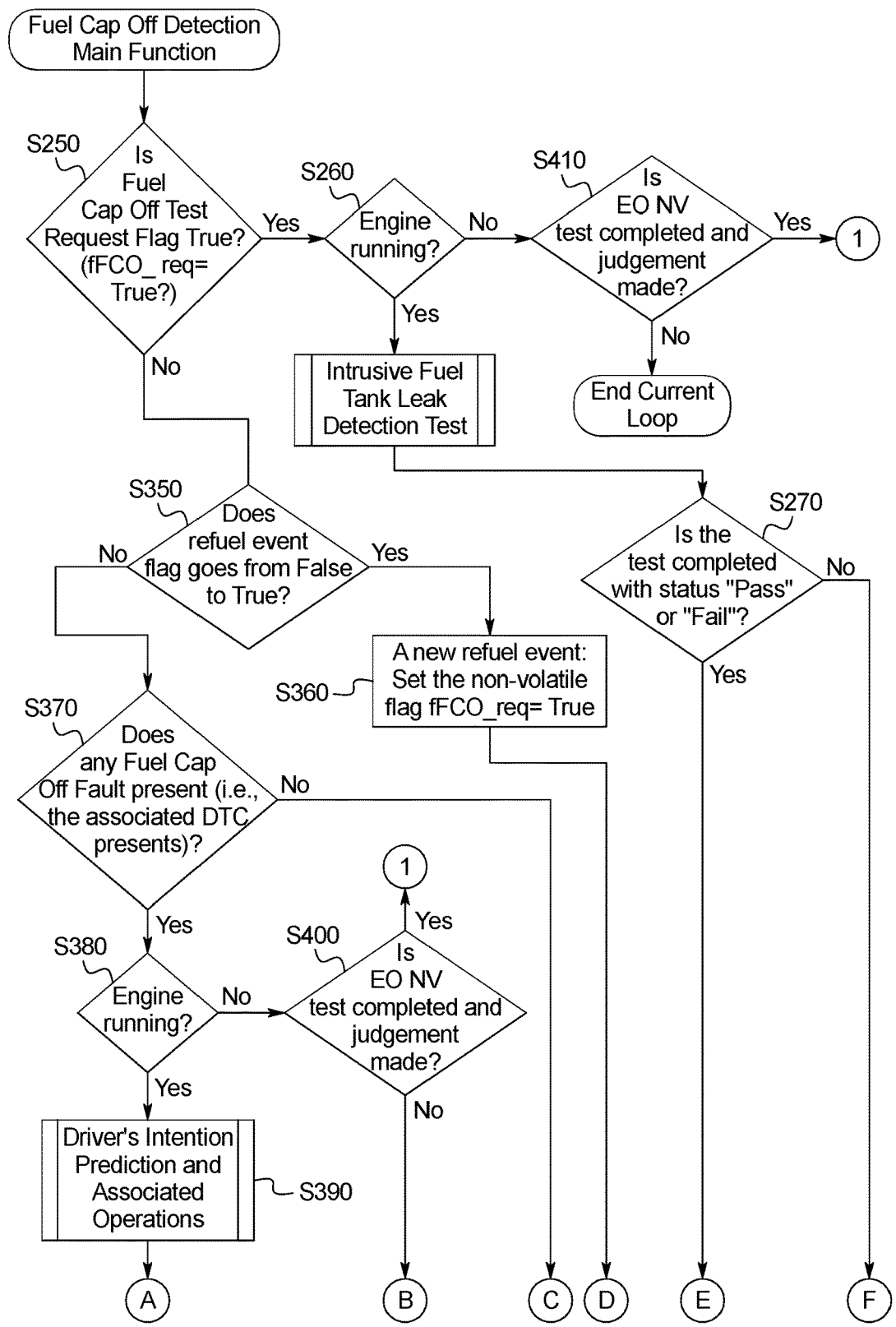
FIGS. 4A and 4B are a flow chart illustrating a fuel cap detection method.
Figure 4B:
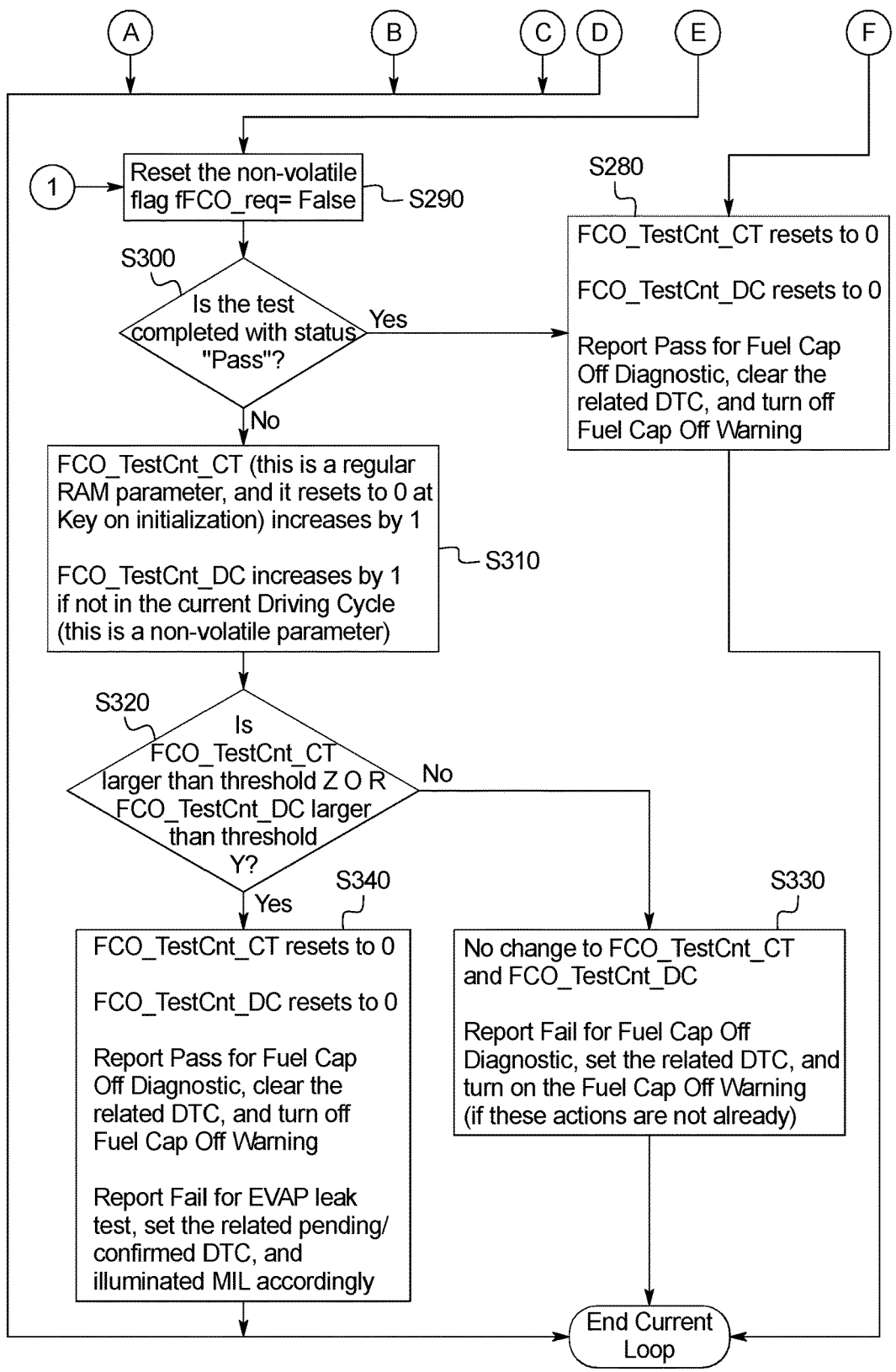

FIGS. 4A and 4B illustrates the fuel cap off detection method performed by the controller 16. First, in step S250, the controller 16 determines whether the fuel cap off test request is true (has a fuel cap off test (fFCO)) been requested, i.e., fFCO_req=True). When the fuel cap off test flag is true, the controller 16 determines if the engine E is running in step S260. If the engine E is running the controller 16 performs the intrusive fuel tank leak detection test discussed above. The controller 16 then determines whether the intrusive fuel tank leak detection test is a "Pass" or "Fail" in step S270. If the test is not completed with a "Pass" or "Fail", the controller 16 resets the FCO_TestCnt_CT and the FCO_TestCnt_DC to 0, determines that the fuel cap off diagnostic is a pass, clears the related diagnostic trouble code (DTC), and turns off the fuel cap warning in step S280, and the current loop is ended.

If the test is completed with a "Pass" or "Fail", the controller 16 rests the non-volatile flag to false (fFCO_req=false) in step S290, and determines whether the intrusive fuel tank leak detection test is completed with a pass in step S300. If the intrusive fuel tank leak detection test is completed with a pass, the controller 16 resets the FCO_TestCnt_CT and the FCO_TestCnt_DC to 0, determines that the Fuel cap off diagnostic is a pass, clear the related DTC, and turns off the fuel cap warning in step S280, and the current loop is ended. If the intrusive fuel tank leak detection test is not completed with a pass, the controller 16 increases the FCO_TestCnt_CT (this is a RAM parameter, and it resets to 0 at Key on initialization) 1 in step S310. The FCO_TestCnt_DC increases by 1 if it is not in the current driving cycle (this is a non-volatile parameter).

The controller 16 then determines whether the FCO_TestCnt_CT is larger than a threshold Z or if the FCO_TestCnt_DC is larger than a threshold Y in step S320. If the FCO_TestCnt_CT is not larger than a threshold Z or if the FCO_TestCnt_DC is not larger than a threshold Y, the controller 16 determines that there is no change to FCO_TestCnt_CT and FCO_TestCnt_DC in step S330 and determines that the fuel cap off diagnostics is a fail, and activates the notification system 18 (e.g., turns on the fuel cap off warning), and the current loop is ended.

If the FCO_TestCnt_CT is larger than a threshold Z or if the FCO_TestCnt_DC is larger than a threshold Y, the controller 16 resets the FCO_TestCnt_CT and the FCO_TestCnt_DC to 0, determines that the Fuel cap off diagnostic is a pass, clears the related DTC, turns off the fuel cap warning (notification system 18), and reports a fail for the EVAP leak test, setting the related pending/confirmed DTC, and illuminates a warning (MIL) accordingly in step S340, and the current loop is ended.

Turning back to step S250, when the fuel cap off test flag is not true, the controller 16 determines whether the refuel even flag is changed from false to true in step S350. When the controller 16 determines that refuel even flag is changed from false to true, the controller 16 sets a new refuel event (i.e., sets a non-volatile flag fFCO_Req=True) in step S360, and ends the current loop. When the controller 16 determines that refuel even flag is not changed from false to true, the controller 16 determines whether there is a fuel cap off fault present (i.e., is the associated DTC present) in step S370. If there are no fuel cap off fault present, the controller 16 ends the current loop.

If there is a fuel cap off fault present, the controller 16 determines whether the engine is running in step S380. If the engine is running the controller 16 determines, in step S390, the driver's intention prediction and associated operations as discussed in the flow chart illustrated in FIGS. 5A and 5B. If the engine is not running, the controller 16 determines whether an EONV test has been completed and whether a judgement has been made in step S400. If an EONV test has been completed and a judgement has been made, the controller 16 rests the non-volatile flag to false (fFCO_req=false) in step S290, and the procedure continues from step S290. If an EONV test has been not completed and a judgement has not been made, the controller 16 ends the current loop.

Turning back to step S260, is the engine is not running, the controller determines whether the EONV test is completed and a judgement made in step S410. If the EONV test is not completed and a judgement is not made, the current loop is ended. If an EONV test has been completed and a judgement has been made, the controller 16 rests the non-volatile flag to false (fFCO_req=false) in step S290, and the procedure continues from step S290.

Figure 5A:
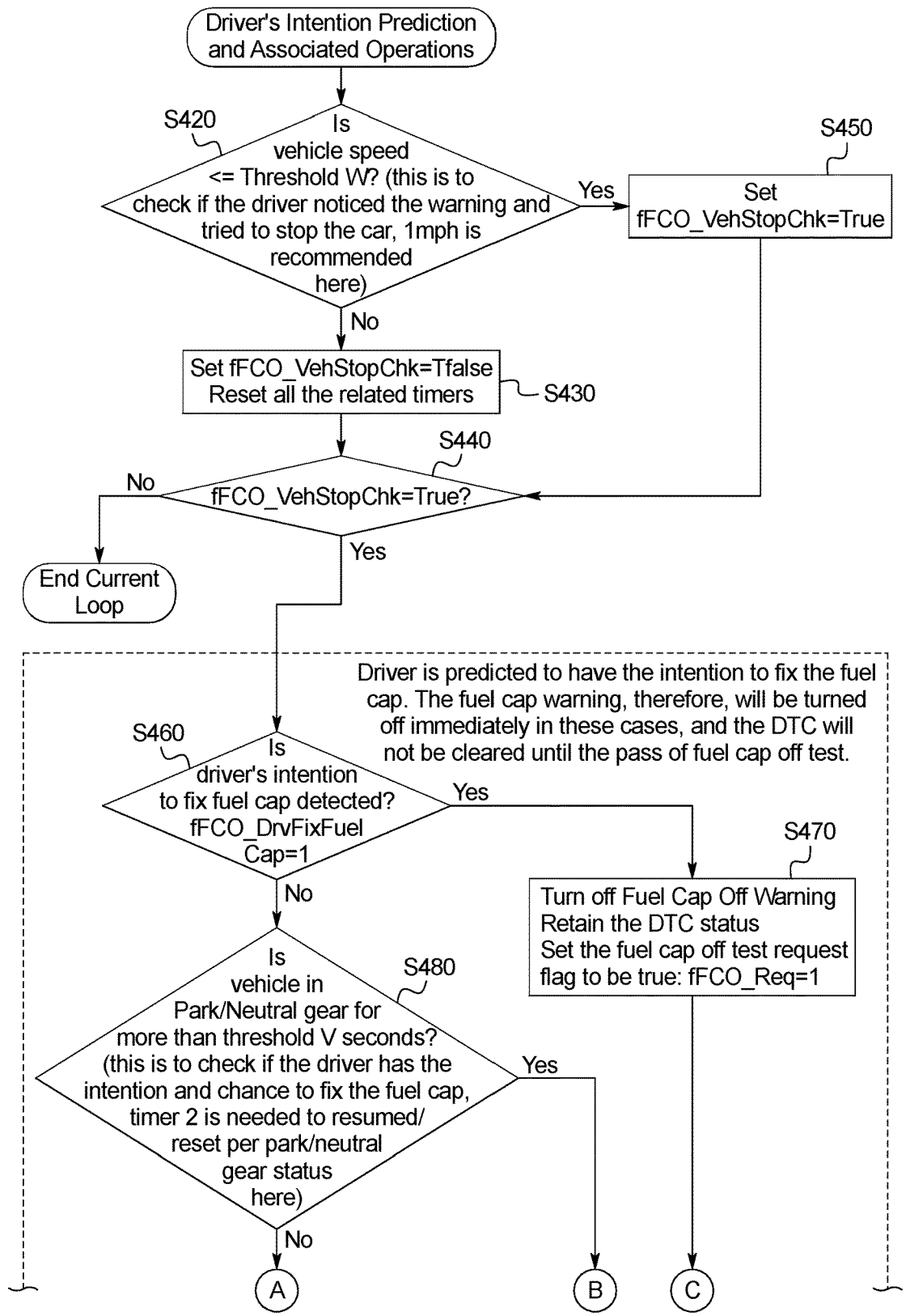
FIGS. 5A and 5B are a flow chart illustrating a driver's intention prediction flow chart.
Figure 5B:
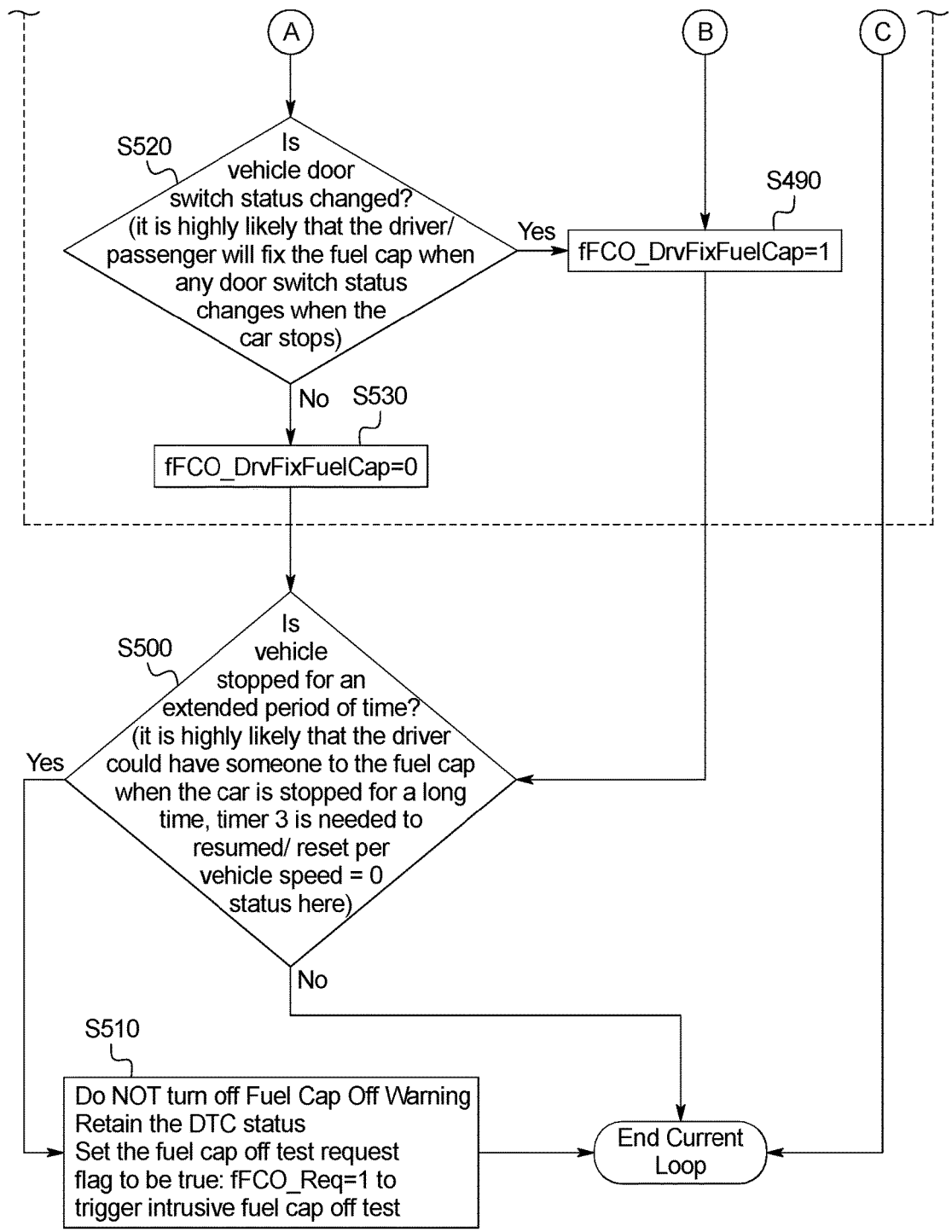

Turing to FIGS. 5A and 5B, a driver's Intention Prediction and Associated Operations procedure is illustrated in which the driver of a user in certain scenarios can turn off the fuel cap off warning. As shown in step S420, the controller 16 determines whether the vehicle speed is less than or equal to a threshold speed (threshold W; e.g., 1 MPH). That is, has the driver noticed the notification regarding the fuel cap 24 and is stopping the vehicle 10. If the vehicle speed is not less than or equal to the threshold W, the controller 16 sets the fFCO_vehStopChk=false and resets all the related times in step S430. The controller 16 then determines in step S440 that the fFCO_vehStopChk does not equal true and end the current loop.

When the controller 16 determines that the vehicle speed is less than or equal to the threshold W, the controller 16 sets the fFCO_vehStopChk=true in step S450. The controller 16 then determines in step S440 that the fFCO_vehStopChk does equal true and enters the stage in which a driver is predicted to have the intention to fix the fuel cap 24. In such a stage the controller 16 can turn off the fuel cap warning (notification system 18) (in some cases immediately), however, the DTC will not be cleared until the pas of the fuel cap off test.

In this stage, the controller 16 determines whether a driver's intention to fix the fuel cap 24 has been detected in step S460. If the driver's intention to fix the fuel cap 24 has been detected, the controller 16 turns off the fuel cap off warning, retains the DTC status, and sets the fuel cap off test request flag to be true (fFCO_Req=1) in step S470, and ends the current loop. When the driver's intention to fix the fuel cap 24 has not been detected, the controller 16 determines whether the vehicle 10 is in park or neutral (transmission status) for more than a threshold time (threshold V) in step S480. This threshold time is generally calculated in seconds and is to determine whether the driver has the intention and chance to reposition or fix the fuel cap 24. Time can be resumed or reset based on the park or neutral status.

When the controller 16 determines that the vehicle 10 is in park or neutral for more than the threshold time (threshold V), the controller 16 sets FFCO_DrvFixFuelCap=1 in step S490. The controller 16 then determines whether the vehicle 10 is stopped for an extended period of time (e.g., a plurality of minutes) in step S500. That is, if the vehicle 10 is stopped for an extended period of time, there is a likelihood that the driver had someone replace the fuel cap 24. When the controller 16 determines that the vehicle 10 is not stopped for an extended period of time, the current loop is ended. When the controller 16 determines that the vehicle 10 is stopped for an extended period of time, the controller 16 does not turn off the fuel cap off warning and retains the DTC status in step S510. The controller 16 also set the fuel cap off test request flag to be true: fFCO_Req=1 so as to start the intrusive fuel cap off test, and ends the current loop.

Turning back to step S480, when the controller 16 determines that vehicle 10 is not in park or neutral for more than a threshold time (threshold V), the controller 16 determines whether the vehicle door switch status has changed in step S520. In such a situation, it is likely that the driver or a passenger will fix the fuel cap 24, since the vehicle 10 has stopped and a door has opened. If the controller 16 determines that the vehicle door switch status has changed, the controller 16 sets FFCO_DrvFixFuelCap=1 in step S490 and continues from this step. When the controller 16 determines that the vehicle door switch status has not changed, the controller 16 sets FFCO_DrvFixFuelCap=0 in step S530 and continues to step S500.

Accordingly, the present invention is improved over the conventional systems. That is, the present invention has wider application range: it can be applied to any evaporative system (e.g., regardless of the location of the pressure sensor, having EONV for small leak detection or not, and the intake method/purge path design of the engine). The invention can seamlessly integrate with existing clogged vent line and EONV functions to increase the accuracy of fuel cap off detection. The invention can detect fuel cap off with the full tank of fuel, and at wider range of ambient temperature conditions. The usage of the purge effort index (PEI) can closely track how much gas was purged for better gross leak detection accuracy. The usage of driver's intention prediction can timely turn on/off fuel cap off warning, and timely request intrusive fuel cap off test to check/confirm if the fuel cap 24 is installed properly The gas tank, engine and canister are conventional components that are well known in the art. Since gas tank, engine and canister are well known in the art, these structures will not be discussed or illustrated in detail herein. Rather, it will be apparent to those skilled in the art from this disclosure that the components can be any type of structure and/or programming that can be used to carry out the present invention.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts.

The term "detect" as used herein to describe an operation or function carried out by a component, a section, a device or the like includes a component, a section, a device or the like that does not require physical detection, but rather includes determining, measuring, modeling, predicting or computing or the like to carry out the operation or function.

The term "configured" as used herein to describe a component, section or part of a device includes hardware and/or software that is constructed and/or programmed to carry out the desired function.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A fuel cap detection system, comprising:
    a charcoal canister connected to a fuel tank of a vehicle, the charcoal canister including a vent valve;
    a notification system configured to notify a user when a fuel cap is incorrectly positioned; and
    an electronic controller configured to perform a leak detection test on the fuel tank by activating the vent valve in the charcoal canister to determine whether the fuel cap is positioned incorrectly, and determine an intent of the user to reposition the fuel cap while the notification system notifies the user that the fuel cap is incorrectly positioned, the intent of the user to reposition the fuel cap based on at least one of a change in vehicle velocity, placing the vehicle in park and opening a door of the vehicle.

2. The system according to claim 1, wherein the electronic controller is configured to determine the intent of the user to reposition the fuel cap based on a velocity of the vehicle.

3. The system according to claim 1, wherein the electronic controller is configured to determine the intent of the user to reposition the fuel cap based on a transmission status of the vehicle.

4. The system according to claim 1, wherein the electronic controller is configured to determine the intent of the user to reposition the fuel cap based on a status change in a door of the vehicle.

5. The system according to claim 1, wherein the electronic controller is configured to perform the leak detection test on the fuel tank subsequent to a determination that the user intends to reposition the fuel cap.

6. The system according to claim 1, wherein the notification system is configured to provide at least one of a visual notification, an auditory notification and haptic feedback.

7. The system according to claim 1, wherein the electronic controller is configured to perform the leak detection test on the fuel tank by closing the vent valve in the charcoal canister and determining the pressure in the fuel tank.

8. The system according to claim 1, wherein the electronic controller is configured to cause the notification system to deactivate based on the intent of the user.

9. The system according to claim 1, wherein the electronic controller is configured to determine whether a refueling event has occurred.

10. A fuel cap detection system, comprising:
a charcoal canister connected to a fuel system of a vehicle, the charcoal canister including a vent valve;
a notification system configured to notify a user when a fuel cap of the vehicle is incorrectly positioned; and
an electronic controller configured to perform a leak detection test on the fuel tank by activating the vent valve in the charcoal canister to determine whether the fuel system has a leak, and when pressure in the fuel tank is less than a threshold pressure at less than a predetermined amount of time determine that the leak is caused by a first opening having a diameter no greater than a predetermined diameter, and when the pressure in the fuel tank is greater than the threshold pressure at greater than the predetermined amount of time determine the leak is caused by a second opening having a diameter greater than the predetermined diameter, cause the notification system to notify the user that the fuel cap is incorrectly positioned when the leak is caused by the second opening, and determine an intent of the user to reposition the fuel cap while the notification system notifies the user that the fuel cap is incorrectly positioned, the intent of the user to reposition the fuel cap based on at least one of a change in vehicle velocity, placing the vehicle in park and opening a door of the vehicle.

11. The system according to claim 10, wherein the electronic controller is configured to determine an intent of the user to reposition the fuel cap while the notification system notifies the user that the fuel cap is incorrectly positioned.

12. The system according to claim 11, wherein the electronic controller is configured to determine the intent of the user to reposition the fuel cap based on the velocity of the vehicle.

13. The system according to claim 12, wherein the electronic controller is configured to determine the intent of the user to reposition the fuel cap based on at least one of a transmission status of the vehicle and a status change in a door of the vehicle.

14. The system according to claim 13, wherein the electronic controller is configured to perform the leak detection test on the fuel tank subsequent to the determination that the user intends to reposition the fuel cap.

15. The system according to claim 14, wherein the electronic controller is configured to cause the notification system to deactivate based on the intent of the user.

16. The system according to claim 1, wherein the notification system is configured to provide at least one of a visual notification, an auditory notification and haptic feedback.

17. The system according to claim 1, wherein the electronic controller is configured to determine whether a refueling event has occurred.

* * * * *